(12) United States Patent
Matsuo et al.

(10) Patent No.: US 9,497,948 B2
(45) Date of Patent: Nov. 22, 2016

(54) SPINNING REEL

(71) Applicant: Shimano Inc., Sakai, Osaka (JP)

(72) Inventors: Shingo Matsuo, Osaka (JP); Keigo Kitajima, Osaka (JP)

(73) Assignee: Shimano Inc., Osaka (JP)

( * ) Notice: Subject to any disclaimer, the term of this patent is extended or adjusted under 35 U.S.C. 154(b) by 345 days.

(21) Appl. No.: 14/247,744

(22) Filed: Apr. 8, 2014

(65) Prior Publication Data

US 2014/0346266 A1    Nov. 27, 2014

(30) Foreign Application Priority Data

May 21, 2013  (JP) ................................. 2013-107173

(51) Int. Cl.
*A01K 89/01*  (2006.01)

(52) U.S. Cl.
CPC ........... *A01K 89/0117* (2013.01); *A01K 89/01* (2013.01)

(58) Field of Classification Search
CPC ........... A01K 89/01; A01K 89/01121; A01K 89/011221; A01K 89/011223; A01K 89/01928; A01K 89/0193
See application file for complete search history.

(56) References Cited

U.S. PATENT DOCUMENTS

| | | | |
|---|---|---|---|
| 2001/0032901 A1* | 10/2001 | Sato ....................... | A01K 89/00 242/232 |
| 2002/0056776 A1* | 5/2002 | Sugawara .............. | A01K 89/01 242/231 |
| 2003/0075631 A1* | 4/2003 | Tsutsumi ............... | A01K 89/01 242/263 |
| 2003/0205637 A1* | 11/2003 | Nakajima ............. | A01K 89/006 242/283 |
| 2004/0206840 A1* | 10/2004 | Kitajima ................ | A01K 89/01 242/306 |
| 2005/0145735 A1* | 7/2005 | Ikuta ...................... | A01K 89/01 242/307 |
| 2005/0274838 A1* | 12/2005 | Sugahara ........... | A01K 89/0111 242/306 |

(Continued)

FOREIGN PATENT DOCUMENTS

| | | |
|---|---|---|
| EP | 2 625 954 A1 | 8/2013 |
| JP | 2000-83533 A | 3/2000 |
| JP | 2011-231889 A | 11/2011 |

OTHER PUBLICATIONS

European Search Report of corresponding EP Application No. 14 16 5030.9 dated Oct. 23, 2014.

*Primary Examiner* — Emmanuel M Marcelo
(74) *Attorney, Agent, or Firm* — Global IP Counselors (57) ABSTRACT

A spinning reel includes a handle, a reel unit, a rotor, a spool, a rotor drive mechanism, and an anti-reverse mechanism. The reel unit has a fishing rod attachment portion and a mount portion. The rotor drive mechanism includes a drive gear and a pinion gear. The pinion gear is disposed in the through hole. The pinion gear is meshed with the drive gear. The anti-reverse mechanism is configured to prevent the rotor from rotating in a fishing-line releasing direction. The anti-reverse mechanism includes a one-way clutch assembly. The one-way clutch assembly is detachably attached to the mount portion of the reel unit. The rotor drive mechanism includes a seal member. The seal member is configured to seal a clearance between the pinion gear and the through hole while being disposed at a rear end of the one-way clutch assembly in the back-and forward direction.

14 Claims, 6 Drawing Sheets

(56) References Cited

U.S. PATENT DOCUMENTS

| | | | |
|---|---|---|---|
| 2006/0266861 A1* | 11/2006 | Kitajima | A01K 89/01 242/322 |
| 2008/0149750 A1* | 6/2008 | Kitajima | A01K 89/01 242/224 |
| 2009/0072066 A1* | 3/2009 | Saito | A01K 89/0114 242/273 |
| 2011/0042500 A1* | 2/2011 | Saito | A01K 89/01 242/224 |
| 2011/0174909 A1* | 7/2011 | Shibata | A01K 89/01 242/230 |
| 2011/0233316 A1* | 9/2011 | Chan | A01K 89/01 242/224 |
| 2012/0048981 A1* | 3/2012 | Ohara | A01K 89/0108 242/230 |
| 2013/0206889 A1* | 8/2013 | Ochiai | A01K 89/00 242/322 |
| 2014/0231569 A1* | 8/2014 | Hui | A01K 89/0111 242/234 |

* cited by examiner

SPINNING REEL

CROSS-REFERENCE TO THE RELATED APPLICATIONS

This application claims priority to Japanese Patent Application No. 2013-107173 filed on May 21, 2013. The entirety disclosure of Japanese Patent Application No. 2013-107173 is hereby incorporated herein by reference.

BACKGROUND

Field of the Invention

The present invention relates to a fishing reel, and particularly to a spinning reel configured to forwardly reel out a fishing line.

Background Art

A spinning reel includes a handle, a reel unit, a rotor, a spool, a rotor drive mechanism, and an anti-reverse mechanism. The reel unit supports the handle in a rotatable state. The rotor has an attachment portion formed in a tubular shape, and is rotatably attached to the reel unit. The spool is a member about which a fishing line is wound by the rotor. The rotor drive mechanism includes a drive gear and a pinion gear. The drive gear is configured to be rotated in conjunction with rotation of the handle. The pinion gear is meshed with the drive gear and rotates the rotor. The reel unit has a mount portion on the front part thereof. The mount portion is a circular portion to which the anti-reverse mechanism is attached. The anti-reverse mechanism is configured to prevent the rotor from rotating in a fishing-line releasing direction through the pinion gear. The anti-reverse mechanism includes a one-way clutch assembly of a roller type. The one-way clutch assembly is fixed to the mount portion of the reel unit by screw members.

For example, Japan Laid-open Patent Application Publication No. JP-A-2000-083533 describes an example of a well-known spinning reel equipped with the anti-reverse mechanism structured as described above. The spinning reel includes a sealing ring for preventing intrusion of liquid through a clearance between the anti-reverse mechanism and the mount portion of the reel unit. The sealing ring is a tubular member with a small thickness, and is made of synthetic rubber. The sealing ring covers the outer peripheral surface of the one-way clutch assembly and that of the mount portion of the reel unit. With the structure, it is possible to prevent intrusion of liquid into the interior of the one-way clutch assembly and that of the reel unit through the clearance on the outer peripheral side of the one-way clutch assembly and clearance between the one-way clutch assembly and the mount portion of the reel unit.

SUMMARY

The well-known spinning reel can prevent intrusion of liquid into the interior of the reel unit from the interior of the rotor. However, there are chances of intrusion into the anti-reverse mechanism from the reel unit by the liquid that has intruded into the interior of the reel unit and a foreign object such as grease applied to the interior of the reel unit. When liquid intrudes into the anti-reverse mechanism, chances are that the one-way clutch assembly is corroded and/or salt precipitated from seawater gets stuck with the roller, and thereby, the one-way clutch assembly causes an action failure. On the other hand, when grease intrudes into the anti-reverse mechanism, chances are that a roller of the one-way clutch assembly slips, and thereby, a reverse rotation preventing state becomes unstable.

It is an advantage of the present invention to inhibit intrusion of a foreign object into an anti-reverse mechanism from the interior of a reel unit in a spinning reel.

A spinning reel is configured to reel out a fishing line in a forward direction. The spinning reel includes a handle, a reel unit, a rotor, a spool, a rotor drive mechanism, and an anti-reverse mechanism. The reel unit supports the handle in a rotatable state. The reel unit has a fishing rod attachment portion and a mount portion The fishing rod attachment portion allows a fishing rod to be attached thereto. The mount portion has a circular shape. The mount portion is disposed in a front part of the reel unit. The mount portion has a through hole in a center thereof. The through hole extends in the forward direction. The rotor has an attachment portion having a tubular shape. The rotor is rotatably mounted to the reel unit. The fishing line is wound by the rotor on the spool. The spool is mounted to the reel unit to be reciprocated in a back and forth direction being parallel to the forward direction. The rotor drive mechanism includes a drive gear and a pinion gear. The drive gear has face gear teeth. The drive gear is configured to be rotated in conjunction with rotation of the handle. The pinion gear has a tubular shape. The pinion gear is coupled at a front portion thereof to the attachment portion of the rotor to be unitarily rotatable with the attachment portion. The pinion gear is disposed in the through hole. The pinion gear is meshed with the drive gear. The anti-reverse mechanism is configured to prevent the rotor from rotating in a fishing-fine releasing direction. The anti-reverse mechanism includes a one-way clutch assembly. The one-way clutch assembly is detachably attached to the mount portion of the reel unit. The rotor drive mechanism includes a seal member. The seal member is configured to seal a clearance between the pinion gear and the through hole while being disposed at a rear end of the one-way clutch assembly in the back-and forward direction.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
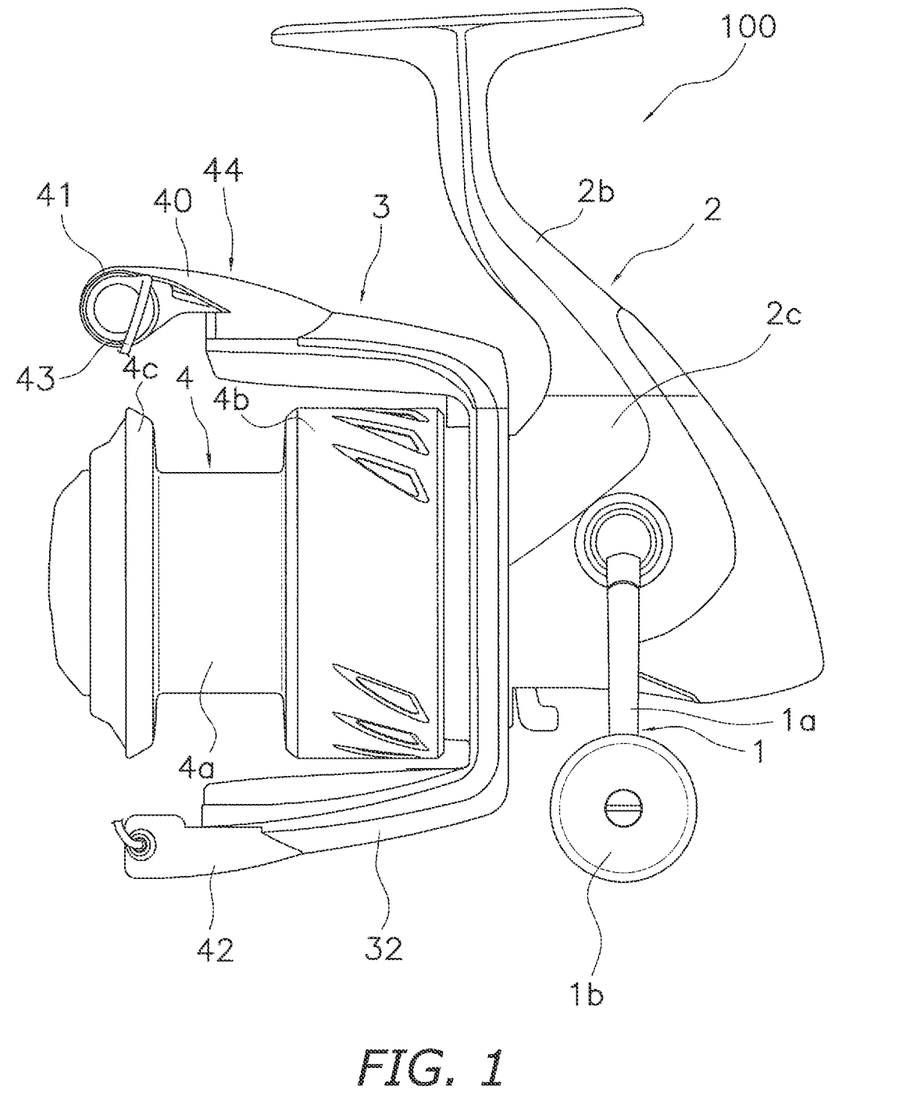
FIG. 1 is a side view of a spinning reel according to an exemplary embodiment of the present invention.
Figure 2:
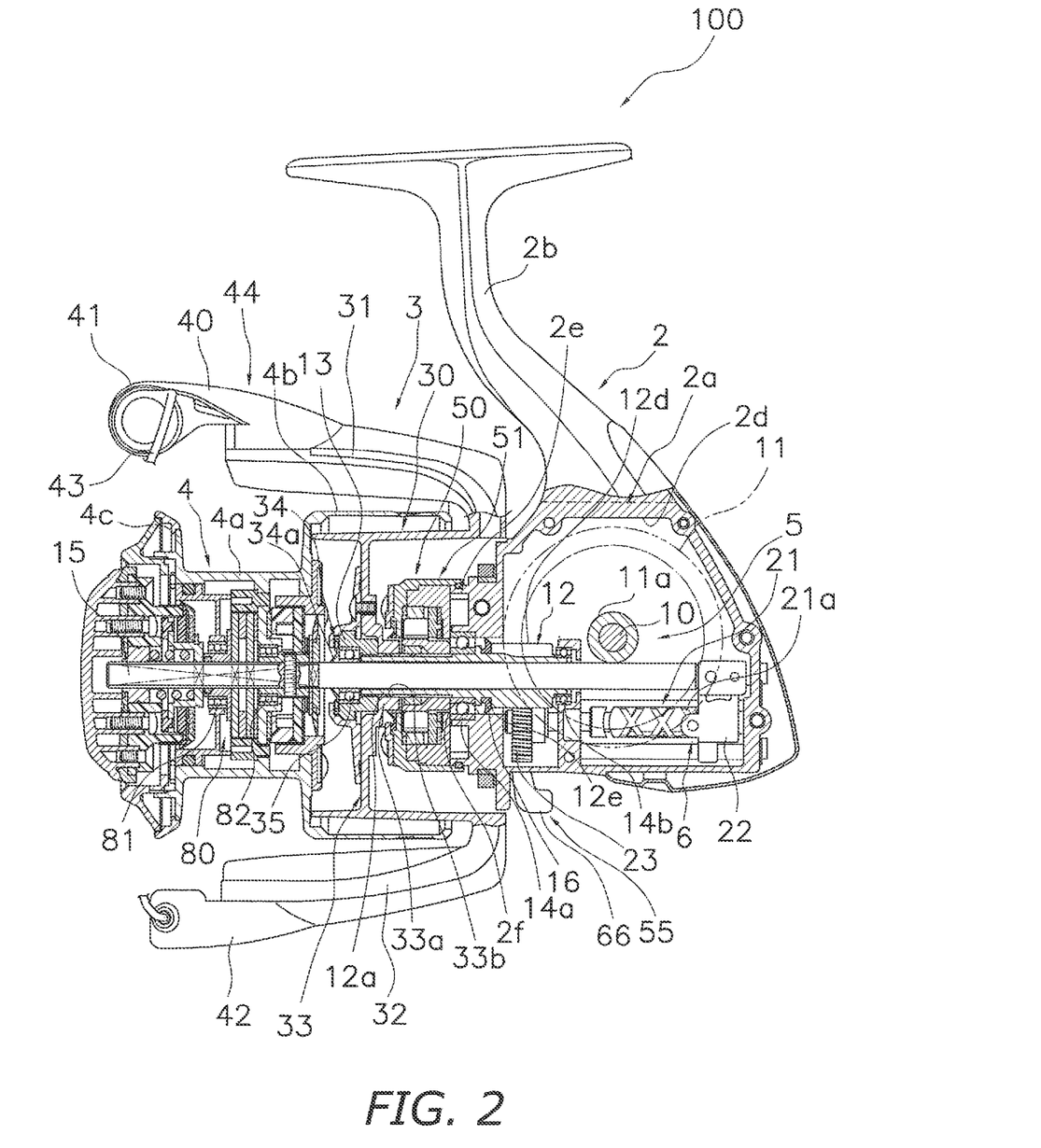
FIG. 2 is a cross-sectional side view of the spinning reel.

In FIG. 1, a spinning reel 100 according to an exemplary embodiment of the present invention is configured to reel out a fishing line to the forward (leftward in FIG. 2). The spinning reel 100 includes a handle 1, a reel unit 2 for supporting the handle 1 in a rotatable state, a rotor 3, and a spool 4. As illustrated in FIG. 2, the spinning reel 100 further includes a rotor drive mechanism 5, an oscillating mechanism 6, and an anti-reverse mechanism 50. The rotor 3 is rotatably supported at the front of the reel unit 2. The spool 4 is a member that the fishing line is wound onto the outer peripheral surface thereof. The spool 4 is disposed at the front of the rotor 3, While being movable back and forth. The rotor drive mechanism 5 is configured to transmit rotation of the handle 1 to the rotor 3 in order to rotate the rotor 3, and is also configured to transmit the rotation of the handle 1 to the oscillating mechanism 6. The oscillating mechanism 6 is configured to reciprocate the spool 4 back and forth in conjunction with the rotation of the handle 1. The anti-reverse mechanism 50 is configured to prevent the rotor 3 from rotating reversely, i.e., in the fishing-line releasing direction. It should be noted that the anti-reverse mechanism 50 according to the present exemplary embodiment is switchable between two states, i.e., a state of preventing the reverse rotation of the rotor 3 and a state of allowing the reverse rotation of the rotor 3.

Handle

The handle 1 includes a crank arm 1a and a knob 1b. The crank arm 1a is coupled to a drive shaft 11a (to be described), while being unitarily rotatable therewith. The knob 1b is rotatably attached to the tip end of the crank arm 1a. The handle 1 is attachable to either the right side or the left side of the drive shaft 11a illustrated in FIG. 1. It should be herein noted that "right" and "left" are directional terms defined in a rear view of the spinning reel 100. On the other hand, "up" and "down" are directional terms defined in FIGS. 1 and 2.

Reel Unit

The reel unit 2 includes a reel body 2a, a fishing rod attachment portion 2b, and a lid member 2c. The fishing rod attachment portion 2b extends obliquely upwards and forwards from the reel body 2a, and allows a fishing rod to be attached thereto. As illustrated in FIG. 2, the reel body 2a has a mechanism attachment space 2d in the interior thereof. The rotor drive mechanism 5 and the oscillating mechanism 6 are disposed in the space 2d. The rotor drive mechanism 5 is configured to rotate the rotor 3 in conjunction with the rotation of the handle 1. The oscillating mechanism 6 is configured to move the spool 4 back and forth in order to uniformly wind the fishing line. The space 2d is closed by the lid member 2c. The reel body 2a has a mount portion 2e in the front part thereof. The mount portion 2e is a circular portion protruding forwards. The mount portion 2e has a through hole 2f in the center thereof. The through hole 2f is disposed in the back-and-forth direction. As illustrated in an enlarged view of FIG. 3, the mount portion 2e has an annular groove 2g on the outer peripheral part thereof. The annular groove 2g is disposed rearwards of the front surface of the mount portion 2e. Further, a plurality of (e.g., three) first female threaded portions 21h are bored in the front surface of the mount portion 2e, while being circumferentially aligned at intervals.

Rotor Drive Mechanism

The rotor drive mechanism 5 includes the drive shaft 11a, a drive gear 11, a pinion gear 12, and a seal member 16. The drive shaft 11a is configured to be rotated in conjunction with the rotation of a handle shaft 10 to which the handle 1 is coupled. The drive gear 11 is formed either integrally with or separately from the drive shaft 11a. The drive gear 11 is configured to be unitarily rotated with the drive shaft 11a. The pinion gear 12 is meshed with the drive gear 11. The drive gear 11 has face gear teeth.

Figure 4:
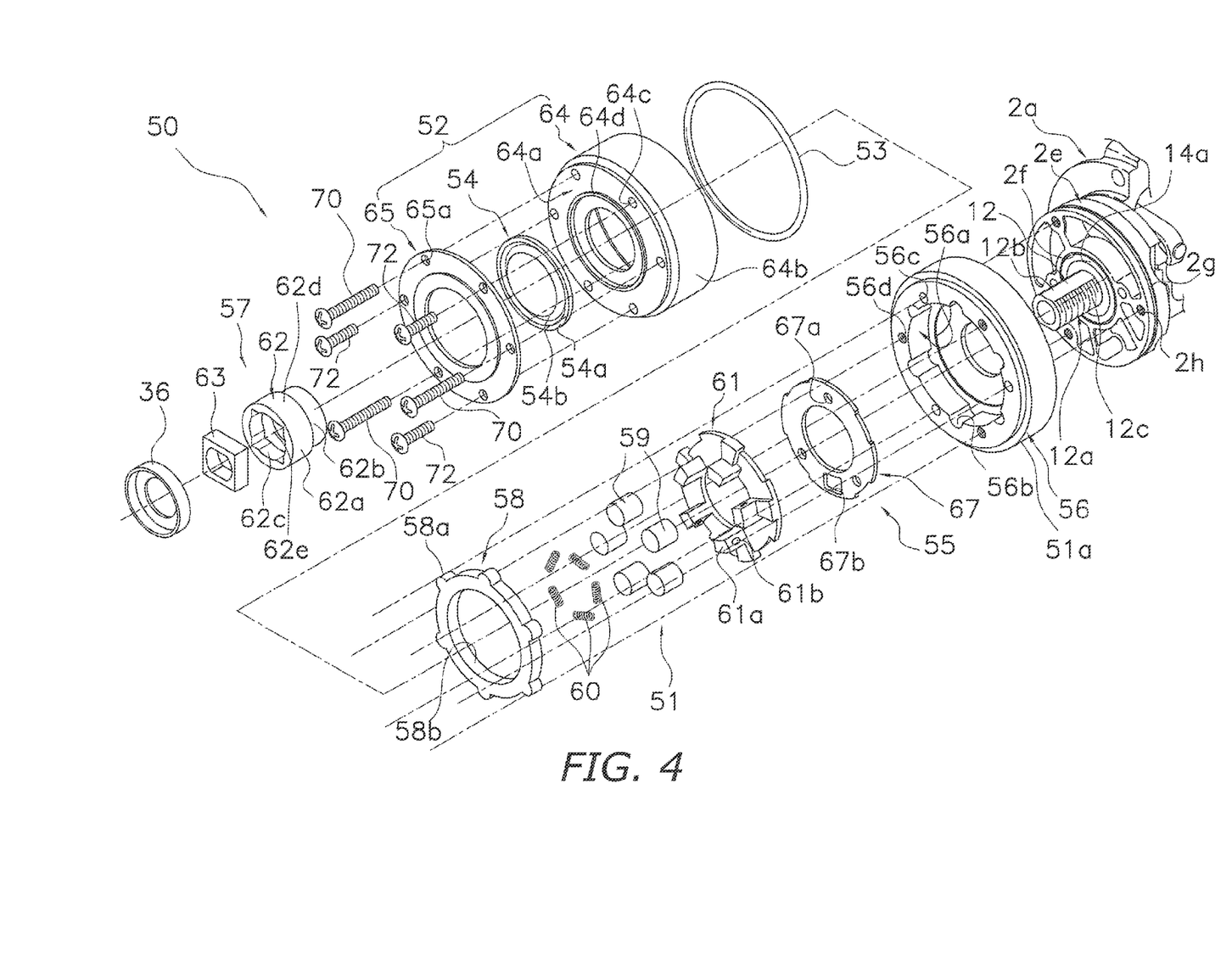
FIG. 4 is an exploded perspective view of the anti-reverse mechanism.

The pinion gear 12 is formed in a tubular shape. A front portion 12a of the pinion gear 12 is coupled to an attachment portion 33a of the rotor 3 by a nut 13, while penetrating through the center part of the rotor 3. Thus, the pinion gear 12 is unitarily rotatable with the rotor 3. The pinion gear 12 is disposed in the back-and-forth direction, while penetrating through the through hole 2f. As illustrated in FIG. 4, a pair of chamfered portions 12b and a pair of male threaded portions 12c are formed on the front portion 12a of the pinion gear 12. The chamfered portions 12b are parallel portions having a predetermined length. The male threaded portions 12c are portions onto which the nut 13 is screwed. The chamfered portions 12b are formed for non-rotatably coupling the rotor 3 and a one-way clutch assembly 51 to the pinion gear 12. The one-way clutch assembly 51 is configured to prevent the rotor 3 from rotating in the fishing-line releasing direction. The pinion gear 12 has gear teeth 12d on the rear pail thereof. The gear teeth 12d are meshed with the face gear teeth of the drive gear 11. The pinion gear 12 is rotatably supported by the reel unit 2 through a front bearing 14a and a rear bearing 14b. Specifically, the intermediate portion and the rear end portion of the pinion gear 12, which are disposed on the both axial sides of the gear teeth 12d, are respectively supported by the front bearing 14a and the rear bearing 14b. Further, the pinion gear 12 has an annular attachment groove 12e on the outer peripheral surface of the part on which the gear teeth 12d are formed. The attachment groove 12e is disposed in opposition to the through hole 2f of the reel body 2a.

Figure 3:
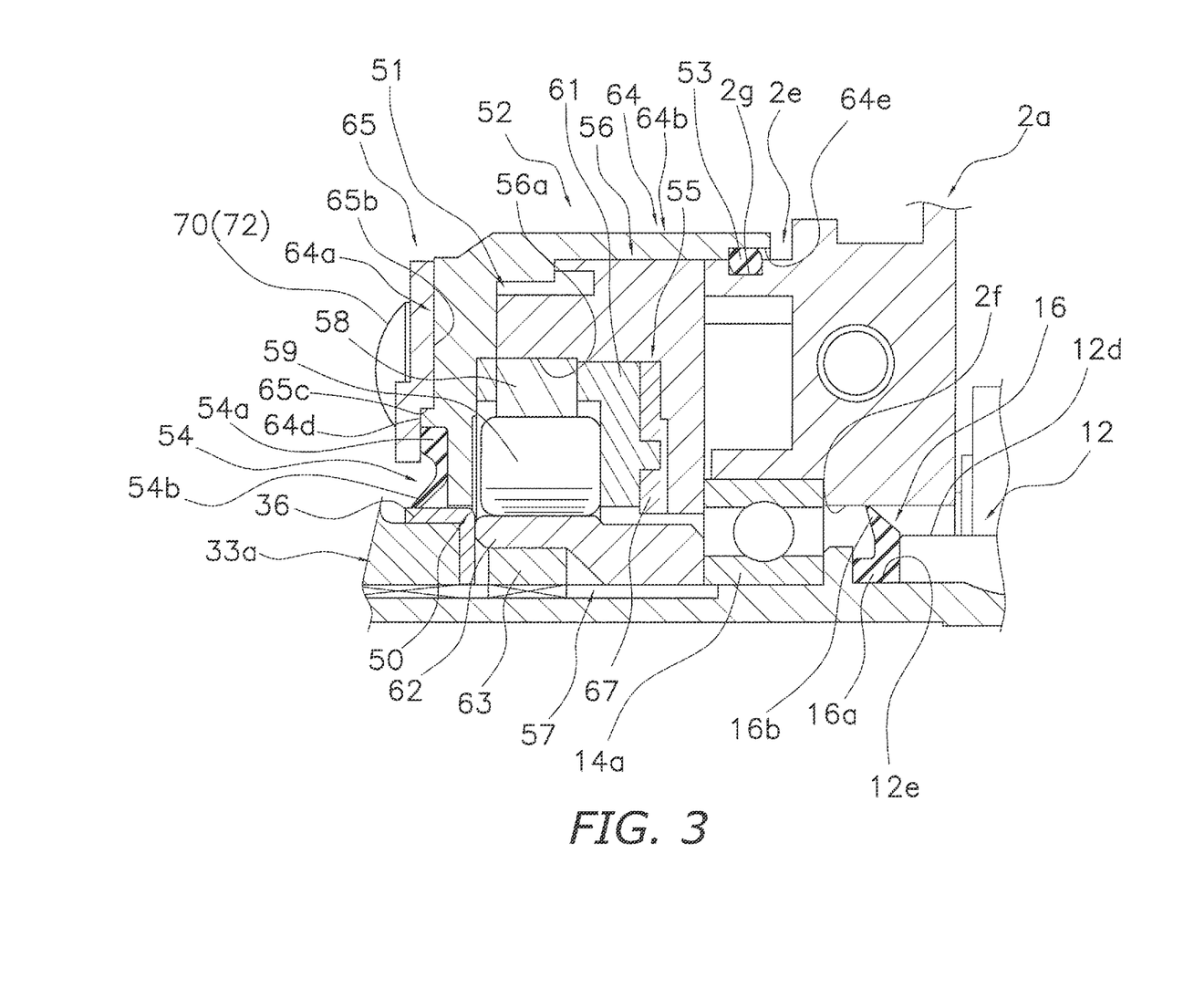
FIG. 3 is an enlarged cross-sectional view of an anti-reverse mechanism.

As illustrated in the enlarged view of FIG. 3, the seal member 16 is fitted into the attachment groove 12e in order to seal a clearance between the through hole 2f and the pinion gear 12. The seal member 16 has a ring portion 16a and a lip portion 16b. The ring portion 16a is fitted into the attachment groove 12e. The tip portion 16b is a tapered portion integrally formed with the ring portion 16a. The lip portion 16b makes contact with the inner peripheral surface of the through hole 2f. The lip portion 16b is slated towards the front bearing 14a. The seal member 16 prevents intrusion of a foreign object (e.g., grease) into the one-way clutch assembly 51 from the space 2d of the reel unit 2. by seating the clearance between the through hole 2f and the pinion gear 12. Grease is mainly applied to the gear teeth of the drive gear 11, those of the pinion gear 12, engaging surfaces (e.g., the outer peripheral surface of a traverse cam shaft 21 (to be described) of the oscillating mechanism 6), and support portions for rotary members (e.g., the drive shaft 11a, a spool shaft 15 and the pinion year 12).

Oscillating Mechanism

The oscillating mechanism 6 is a mechanism of a traverse cam type, and is configured to reciprocate the spool shaft 15 coupled to the center part of the spool 4 through a drag mechanism 80 (to be described) in the back-and-forth direction. The spool 4 is thereby configured to be reciprocated in the back-and-forth direction. The oscillating mechanism 6 includes the traverse cam shaft 21, a slider 22, and an intermediate gear 23. The traverse cam shaft 21 is disposed below and in parallel to the spool shaft 15. The slider 22 is configured to be moved along the traverse cam shaft 21 in the back-and-forth direction. The intermediate gear 23 is fixed to the tip end of the traverse cam shaft 21. The rear end of the spool shaft 15 is non-rotatably fixed to the slider 22. The intermediate gear 23 is meshed with the pinion gear 12 through a reduction mechanism (not illustrated in the figures). The traverse cam shaft 21 has intersecting helical grooves 21a on the surface thereof.

Rotor

The rotor 3 is rotatably supported by the reel body 2a. As illustrated in FIG. 2, the rotor 3 has a tubular part 30, a first rotor arm 31, and a second rotor arm 32. The first and second rotor arms 31 and 32 are disposed laterally to the tubular part 30, while being opposed to each other. The tubular part 30 and the both rotor arms 31 and 32 are made of aluminum alloy, for instance, and are integrally molded.

The tubular part 30 has a wall portion 33 in the inner peripheral part thereof. The wall portion 33 is formed in a circular shape, and has the tubular attachment portion 33a in the center part thereof. The attachment portion 33a has a fitting hole 33b bored in the center part thereof. The fitting hole 33b is an elongated hole, and is coupled to the chamfered portions 12b of the pinion gear 12 while being unitarily rotatable therewith. The front portion 12a of the pinion gear 12 and the spool shaft 15 penetrate through the fitting hole 33b. With the structure where the fitting hole 33b is engaged with the chamfered portions 12b of the pinion gear 12, the rotor 3 is coupled to the pinion gear 12 while being unitarily rotatable therewith. The attachment portion 33a has a gap filling member 36 disposed on the outer periphery thereof. The gap filling member 36 is a closed-end tubular member made of stainless alloy. The gap filling member 36 is disposed for enhancing the sealing performance of a second seal member 54 to be described.

A nut 13 is disposed in front of the wall portion 33. A bearing 35 is disposed in the interior of the nut 13. The bearing 35 supports the spool shaft 15 in a rotatable state. A clearance between the pinion gear 12 and the spool shaft 15. Thus, even when the spool shaft 15 is deflected, the rotation of the rotor 3 is unlikely to be affected by the deflection. Therefore, the rotor 3 can be rotated with a small force. A shaft seal 34 is attached to the front surface of the nut 13. The shaft seal 34 seals the clearance between the nut 13 and the spool shaft 15, The shaft seal 34 has a lip 34a. The inner peripheral side of the lip 34a is tapered and makes contact with the spool shaft 15.

A first rotor arm 31 forwardly extends from the tubular part 30, while being outwardly curved in a convex shape. A part of the first rotor arm 31, which is connected to the tubular part 30, is curved while extending in the circumferential direction of the tubular part 30. A first bail support member 40 is pivotally attached to the outer peripheral side of the tip end of the first rotor arm 31. A line roller 41 is attached to the tip end of the first bail support member 40 in order to guide the fishing line to the spool 4.

A second rotor arm 32 is forwardly extending from the tubular part 30, while being outwardly curved in a convex shape. A part of the second rotor arm 32, which is connected to the tubular part 30, is curved while extending in the circumferential direction of the tubular part 30. A second bail support member 42 is pivotally attached to the outer peripheral side of the tip end of the second rotor arm 32.

A bail 43 is fixed between the line roller 41 and the second bail support member 42. The bail 43 is formed by curving a wire rod in a roughly U-shape. The first bail support member 40, the second bail support member 42, the line roller 41, and the bail 43 form a bail arm 44 for guiding the fishing line to the spool 4. The bail arm 44 is pivotal between a fishing-line guide position illustrated in FIG. 2 and a fishing-line release position inverted therefrom.

Anti-Reverse Mechanism

The anti-reverse mechanism 50 is disposed in the interior of the tubular part 30 of the rotor 3. As illustrated in FIGS. 3 and 4, the anti-reverse mechanism 50 includes the one-way clutch assembly 51 of a roller type with a free-wheeling inner race 57, a cover member 52, a first seal member 53, the second seal member 54, and a switch mechanism 55.

The one-way clutch assembly 51 includes a circular case member 56 mountable to the mount portion 2e, the inner race 57 accommodated in the case member 56, an outer race 58, a plurality of rolling elements 59, a plurality of spring members 60 (see FIG. 4), and a spring holding member 61. The one-way clutch assembly 51 is allowed to be switched between an activated state (reverse rotation preventing state) and a deactivated state (reverse rotation allowing state) by the switch mechanism 55. The one-way clutch assembly 51 is disposed forwards of the gear teeth 12d of the pinion gear 12.

The case member 56 is fixed to the mount portion 2e of the reel body 2a. The case member 56 has an accommodation space 56a. The accommodation space 56a is a roughly circular space for accommodating the aforementioned respective components. A plurality of (e.g., six) recesses 56b are formed on the inner peripheral surface of the accommodation space 56a, while being circumferentially disposed at intervals. The outer race 58 is non-rotatably engaged with the recesses 56b. Further a plurality of (e.g., three) screw insertion through holes 56c and a plurality of (e.g., three) second female threaded portions 56d are bored through the case member 56 in the spool shaft direction, while being alternately disposed at intervals in the circumferential direction. The outer peripheral surface of the case member 56 defines an outer peripheral portion 51a of the one-way clutch assembly 51.

The inner race 57 includes an inner race body 62 and a coupling member 63. The inner race body 62 is rotatably mourned to the pinion gear 12, while making contact with the rolling elements 59. The coupling member 63 couples the inner race body 62 to the pinion gear 12 in a non-rotatable state. The inner race body 62 is a stepped tubular member having a large-diameter portion 62a and a small-diameter portion 62b. The large-diameter portion 62a has a lock recess 62c for locking the coupling member 63 in a non-rotatable state. The lock recess 62c is a roughly rectangular space in a front view. The outer peripheral surface of the large-diameter portion 62a is a circular surface formed by precision machining, and corresponds to a rolling surface 62d on which the rolling elements 59 roll. The small-diameter portion 62b has a circular attachment hole 62e bored in the center part thereof. The attachment hole 62e is attached onto a part of the outer peripheral surface of the pinion gear 12, i.e., a part on which the chamfered portions 12b are not formed. The attachment hole 62e is axis-aligned with and attached onto the pinion gear 12.

The inner race 57 is herein divided into the coupling member 63 and the inner race body 62 making contact with the rolling elements 59. Further, the inner race body 62 is rotatably mounted to the pinion gear 12, while being coupled with the pinion gear 12 through the coupling member 63 that is non-rotatably locked by the inner race body 62 and the pinion gear 12. Therefore, a circular hole can be easily bored with high accuracy into the inner race body 62. Accordingly, the inner race body 62, making contact with the rolling elements 59, can be mounted to the pinion gear 12 with high accuracy. As a result, wobbling can be inhibited between the inner race 57 of the one-way clutch assembly 51 and the pinion gear 12.

The outer race 58 has a plurality of protruding portions 58a on the outer peripheral part thereof. The protruding portions 58a are engaged with the recesses 56b formed on the case member 56. The outer race 58 is thereby non-rotatably mounted to the case member 56. In the radial direction, a relatively large clearance exists between the tip end of each protruding portion 58a and each recess 56b of the case member 56. In the rotational direction, in contrast, a small clearance exists therebetween. Thus, the outer race 58 is configured to be automatically axis-aligned by the inner race 57 and the rolling elements 59. Further, the outer race 58 has a curved cam surface 58b on the inner peripheral surface thereof. The cam surface 58b is formed for exerting a wedge effect on the rolling elements 59. The width (axial length) of the outer race 58 is less than the axial length of the rolling elements 59.

The plural (e.g., five) rolling elements 59 are respectively formed in a cylindrical roller shape. The rolling elements 59 are held by the spring holding member 61.

The spring holding member 61 is rotatably mounted to the case member 56. The spring holding member 61 holds the plural spring members 60 at intervals in the circumferential direction. The spring members 60 hold the plural rolling elements 59 at intervals in the circumferential direction. Further, the spring holding member 61 is configured to be rotated between a reverse rotation allowing position and a reverse rotation preventing position by the switch mechanism 55. The reverse rotation preventing position is a position located about the spool shaft and is different from the reverse rotation allowing position. The spring holding member 61 has a plurality of (e.g., five) holding protrusions 61a. The holding protrusions 61a are forwardly protruding, while being disposed at equal intervals in the circumferential direction. The spring members 60 are held by holding holes 61b bored in the holding protrusions 61a. Each rolling element 59 is held between adjacent two pairs of the spring member 60 and the holding protrusion 61a.

The cover member 52 includes a first cover pan 64 and a second cover part 65. The first cover part 64 has a ring-shaped bottom portion 64a and a tubular portion 64b. The bottom portion 64a covers the front surface of the one-way clutch assembly 51, and allows the pinion gear 12 to penetrate therethrough. The tubular portion 64b is integrally formed with the outer periphery of the bottom portion 64a. The tubular portion 64b covers the outer peripheral portion 51a of the one-way clutch assembly 51 and the outer peripheral side of the mount portion 2e. For example, the first cover part 64 is a member made of rigid material such as metal or synthetic resin. The bottom portion 64a is disposed on the front side of the outer race 58 in order to retain the rolling elements 59. A plurality of (e.g., six) first screw insertion through holes 64c are bored through the bottom portion 64a, while being disposed in the same circumferential positions as the screw insertion through holes 56c and the second female threaded portions 56d of the case member 56. Further, an annular protruding portion 64d is formed on the bottom portion 64a in order to attach the second seal member 54 between the bottom portion 64a and the second cover part 65 and dispose the second cover part 65 concentrically to the first cover part 64. The tubular portion 64b has a mount recess 64e (see FIG. 3) on the inner surface of the rear end part thereof. The mount recess 64e is formed such that the first seal member 53 is disposed therein. When the cover member 52 is fixed to the one-way clutch assembly 51, the mount recess 64e is configured to be disposed in opposition to the annular groove 2g formed on the mount portion 2e. The first seal member 53 is disposed between the mount recess 64e and the annular groove 2g.

The second cover part 65 is a stepped ring-shaped member. The second cover part 65 is mounted to the front surface of the bottom portion 64a of the first cover part 64. The inner peripheral part of the second cover part 65 and the first cover part 64 sandwich therebetween the outer peripheral part of the second seal member 54. A plurality of (e.g., six) second screw insertion through holes 65a (see FIG. 4) are bored through the outer peripheral part of the second cover part 65, while being disposed at intervals in the circumferential direction. The second insertion through holes 65a are allowed to be opposed to the first screw insertion through holes 64c. The second cover part 65 has a fitting portion 65c formed on its rear surface 65b (see FIG. 3). The fitting portion 65c is fitted onto the protruding portion 64d. When the fitting portion 65c is fitted onto the protruding portion 64d, the second cover part 65 is axis-aligned with respect to the first cover part 64. Thus, the cover member 52 is composed of the first cover part 64 and the second cover part 65, and is configured to sandwich the second seal member 54 in the inner peripheral part thereof. Therefore, attachment of the second seal member 54 can be easily performed.

The first seal member 53 is provided for sealing the clearance between the inner peripheral surface of the tubular portion 64b of the cover member 52 and the outer peripheral surface of the mount portion 2e. For example, the first seal member 53 is an O-ring made of synthetic rubber such as NBR (Nitrile Butadiene Rubber) or silicone rubber. The first seal member 53 is attached to the annular groove 2g, while the outer peripheral part thereof makes contact with the mount recess 64e of the cover member 52.

For example, the second seal member 54 is a ring-shaped member made of synthetic rubber such as NBR (Nitrile Butadiene Rubber) or silicone rubber. The second seal member 54 has a ring portion 54a and a lip portion 54b. The ring portion 54b is attached to the inner peripheral portion of the bottom part of the cover member 52. The lip portion 54b is a tapered portion integrally formed with the ring portion 54a, and makes contact with the outer peripheral surface of the gap filling member 36 of the attachment portion 33a. The lip portion 54b is forwardly slanted from the ring portion 54a.

The switch mechanism 55 is provided for switching the one-way clutch assembly 51 between the activated state and the deactivated state. The switch mechanism 55 includes a switch lever 66 and a switch plate 67. As illustrated in FIG. 2, the switch lever 66 is mounted to the lower part of the reel body 2a, while being pivotable about an axis arranged in parallel to the spool shall 15 between the reverse rotation allowing position and the reverse rotation preventing position. As illustrated in FIGS. 3 and 4, the switch plate 67 is rotatably attached to the case member 56. The switch plate 67 has engaged holes 67a and an engaged portion 67b. The engaged holes 67a and the engaged portion 67b are provided for rotating the switch plate 67 in conjunction with the pivot of the switch lever 66. The engaged holes 67a are engaged with the spring holding member 61, while being unitarily rotatable therewith. The engaged portion 67b is engaged with the switch lever 66. The switch plate 67 is configured to be rotated about the spool shaft 15 between the reverse rotation preventing position and the reverse rotation allowing position in conjunction with the pivot of the switch lever 66 between the reverse rotation preventing position and the reverse rotation allowing position. The rotation is transmitted to the spring holding member 61, and thereby, the one-way clutch assembly 51 is switched between the activated state and the deactivated state.

Moreover, the anti-reverse mechanism 50 further includes a plurality of (e.g., three) first screw members 70 and a plurality of (e.g., three) second screw members 72. The first screw members 70 fix the case member 56 and the cover member 52 to the front surface of the mount portion 2e. The second screw members 72 fix the cover member 52 to the case member 56. The length of each first screw member 70 is greater than that of each second screw member 72. The first screw members 70 are respectively screwed into the first female threaded portions 2h of the mount portion 2e, while penetrating through the second screw insertion through holes 65a of the second cover part 65, the first screw insertion through holes 64c of the first cover part 64, and the screw insertion through holes 56c of the case member 56. The second screw members 72 are screwed into the second female threaded portions 56d of the case member 56, while penetrating through the second screw insertion through holes 65a of the second cover part 65 and the first screw insertion through holes 64c of the first cover part 64. The second screw members 72 are used for integrating the cover member 52 and the one-way clutch assembly 51 except for the inner race 57 into a unit. The first screw members 70 are provided for attaching the integrated unit composed of the one-way clutch assembly 51 and the cover member 52 to the mount portion 2e. For example, the first screw members 70 and the second screw members 72 are round head bolt members.

When the anti-reverse mechanism 50 thus structured is embedded into the reel unit 2, the spring members 60 are preliminarily attached to the holding holes 61b of the spring holding member 61, and further, the spring holding member 61 is preliminarily caused to hold the rolling elements 59. Further, the first seal member 53 is preliminarily attached to the annular groove 2g of the mount portion 2e.

Under the condition, the switch plate 67, the spring holding member 61, and the outer race 58 are accommodated in the accommodation space 56a of the case member 56. Next, the second seal member 54 is attached to the inner peripheral surface of the protruding portion 64d of the first cover part 64, and the second cover part 65 is attached to the first cover part 64. At this time, the circumferential positions of the first screw insertion through holes 64c and those of the second screw insertion through holes 65a are preliminarily matched with each other. It should be noted that an arbitrary positioning structure such as convexo-concave fitting can be provided as means for positioning the circumferential position of the first cover part 64 and that of the second cover part 65 such that the circumferential position of the first cover part 64 and that of the second cover part 65 can be matched with each other.

When the aforementioned works are completed, the cover member 52 is fitted onto the outer peripheral surface of the case member 56 while the second cover part 65 is attached to the first cover part 64, and the second screw members 72 are screwed into the case member 56. Thus, the cover member 52 and the one-way clutch assembly 51 except for the inner race 57 are integrated as a unit. When the integration into a unit is completed, the first screw members 70 are screwed into the mount portion 2e while penetrating through the integrated unit composed of the cover member 52 and the one-way clutch assembly 51. Thus, the cover member 52 and the one-way clutch assembly 51 are fixed to the reel unit 2.

It should be noted that the inner race 57 is attached to the chamfered portions 12b of the pinion gear 12 after the pinion gear 12 is attached to the reel unit 2.

Spool

The spool 4 is mounted to the reel body 2a so as to reciprocate back and forth. The fishing line is configured to be wound onto the outer periphery of the spool 4 by the rotor 3. As illustrated in FIG. 2, the spool 4 is disposed between the first and second rotor arms 31 and 32 of the rotor 3. The spool 4 is rotatably mounted to the spool shaft 15 through two bearings 81 and 82. The spool 4 has a bobbin trunk 4a, a skirt 4b and a flange 4c. The skirt 4a is a large-diameter part integrally formed with the bobbin trunk 4a. The flange 4c is a large-diameter part disposed on the front portion of the bobbin trunk 4a. The drag mechanism 80 is disposed in the interior of the bobbin trunk 4a. The spool 4 is frictionally engaged with the spool shaft 15 through the drag mechanism 80. Therefore, the spool 4 is configured not to be rotated with respect to the spool shaft 15 when the drag mechanism 80 is not activated.

In the spinning reel 100 thus structured, chances are that liquid intrudes into the interior of the tubular part 30 from the rear end of the tubular part 30 of the rotor 3 in some situations such as washing of the spinning reel 100. When herein actually intruding into the interior of the tubular part 30, the liquid attempts to intrude into the interior of the anti-reverse mechanism 50. However, the one-way clutch assembly 51 is provided with the cover member 52, and the cover member 52 is provided with the first and second seal members 53 and 54. Therefore, liquid is prevented from intruding into the interior of the anti-reverse mechanism 50 from the bottom portion and the tubular portion of the cover member 52. Consequently, it is possible to more reliably prevent intrusion of liquid through the clearance between the one-way clutch assembly 51 and the reel unit 2.

Other Exemplary Embodiments

An exemplary embodiment of the present invention has been described above. However, the present invention is not limited to the aforementioned exemplary embodiment, and a variety of changes can be made without departing from the scope of the present invention. Especially, a plurality of embodiments and modifications described in the present specification can be arbitrarily combined on an as-needed basis.

In should be noted that in the following description, explanation will be made for components structured differently from the corresponding ones of the aforementioned exemplary embodiment, while three-digit reference numbers are assigned to those components. On the other hand, explanation cannot be made for components that are substantially the same as the corresponding ones of the aforementioned exemplary embodiment, while the reference numbers of the corresponding components are assigned to those components.

Figure 5:
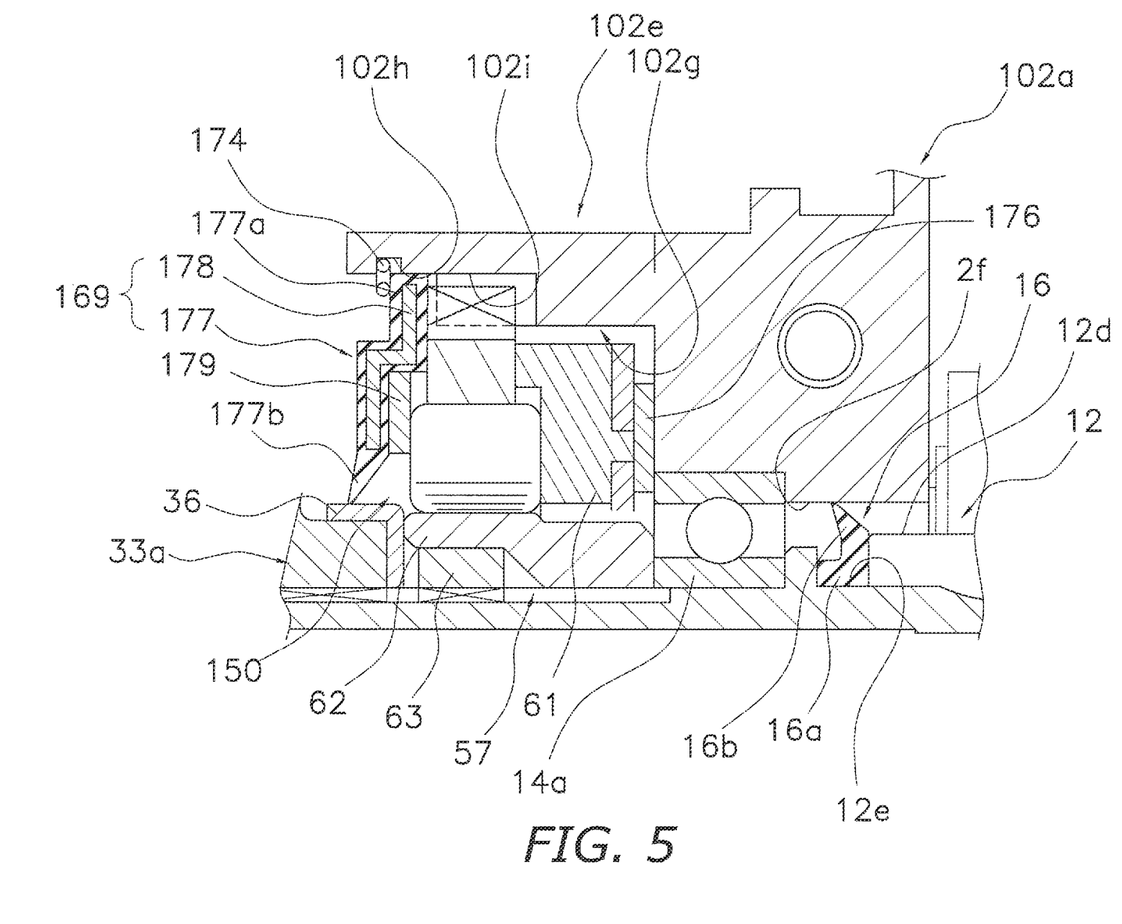
FIG. 5 is a diagram corresponding to FIG. 3 according to another exemplary embodiment.
Figure 6:
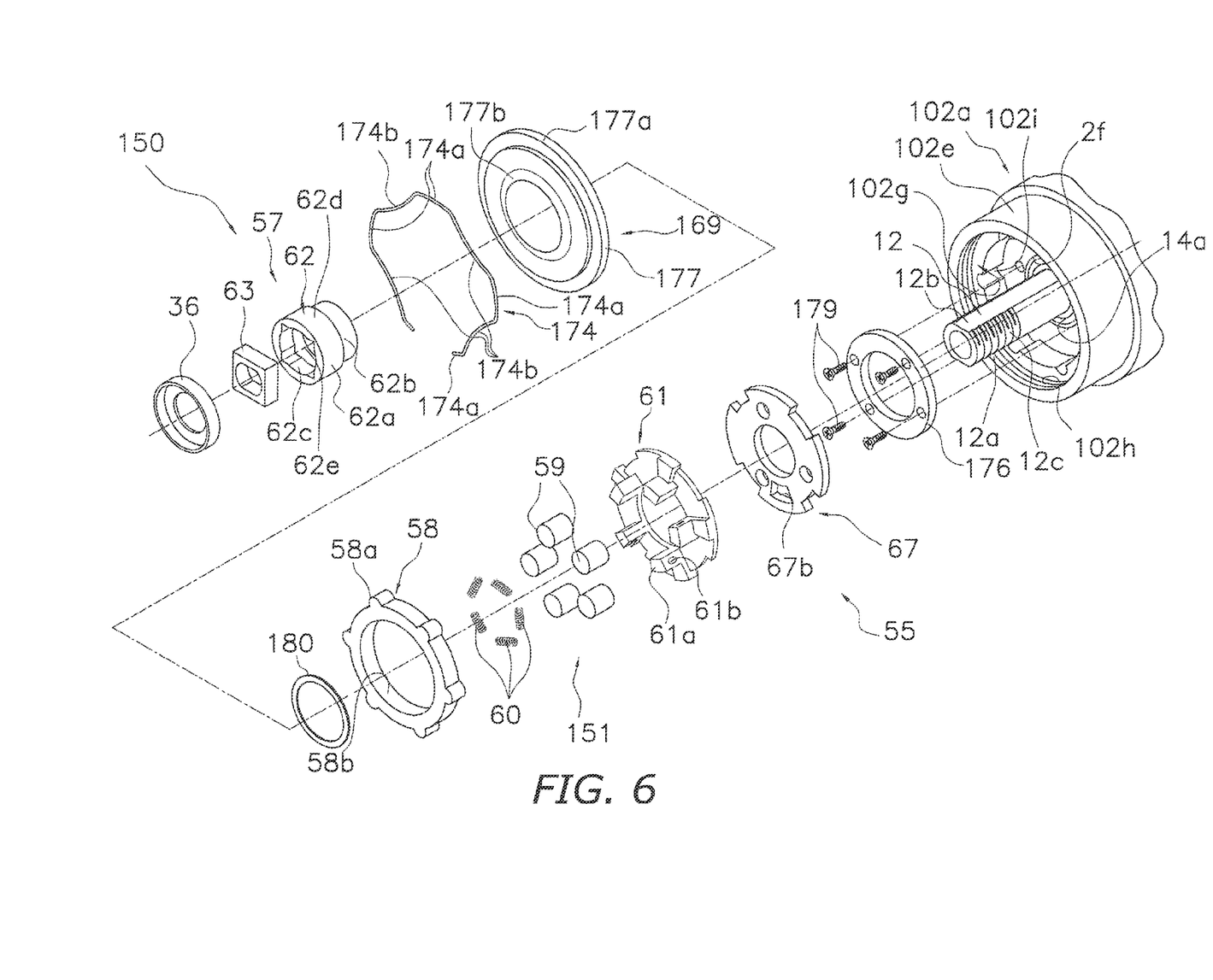
FIG. 6 is a diagram corresponding to FIG. 4 according to another exemplary embodiment.

(a) in the aforementioned exemplary embodiment, the one-way clutch assembly 51 of the anti-reverse mechanism 50 is mounted to the front surface of the mount portion 2e. However, in the present invention, arrangement of the one-way clutch assembly 51 is not limited to the above. As illustrated in FIGS. 5 and 6, the present invention is also applicable to a spinning reel that a one-way clutch assembly 151 is disposed in the interior of a mount portion 102e.

In FIGS. 5 and 6, a reel body 102a has the mount portion 102e formed in a circular shape, and the mount portion 102e has an accommodation space 102g. The accommodation space 102g is a circular space that the tip end thereof is opened and in which the one-way clutch assembly 151 can be accommodated. Further, the front hearing 14a is attached to the through hole 2f of the reel body 102a. Time front beating 14a is restricted front forwardly moving by a restriction plate 176. The restriction plate 176 is an annular member fixed to the bottom part of the accommodation space 102g. The restriction plate 176 is fixed to the bottom pail of the accommodation space 102g by a plurality of (e.g., four) flat head screws 179 to be screwed into the bottom part.

An attachment groove 102h and a plurality of (e.g., six) recesses 102i are formed in the accommodation space 102g. The attachment groove 102h is an annular groove to which a retainer member 174 is attached. The recesses 102i to be described are engaged with the protruding portions 58a of the outer race 58. The plural recesses 102i are disposed at intervals in the circumferential direction.

An anti-reverse mechanism 150 includes the one-way clutch assembly 151 of a roller type with the free-wheeling inner race 57, a third seal member 169, the retainer member 174, and the switch mechanism 55.

The one-way clutch assembly 151 includes the inner race 57, the outer race 58, the plural rolling elements 59, the plural spring members 60 (see FIG. 6), and the spring holding member 61. These components are accommodated in the accommodation space 102g of the mount portion 102e. Therefore, the one-way clutch assembly 151 is different from the one-way clutch assembly 51 of the aforementioned exemplary embodiment in that the one-way clutch assembly 151 is not provided with the case member 56. The one-way clutch assembly 151 is switchable between the activated state (the reverse rotation preventing state) and the deactivated state (the reverse rotation allowing state) by the switch mechanism 55. The one-way clutch assembly 151 is disposed forwards of the gear teeth 12d of the pinion gear 12.

The inner race 57 of the present exemplary embodiment is structured similarly to that of the aforementioned exemplary embodiment. The inner race 57 includes the inner race body 62 and the coupling member 63. The inner race body 62 is rotatably attached to the pinion gear 12, while making contact with the rolling elements 59. The coupling member 63 couples the inner race body 62 to the pinion gear 12 in a non-rotatable state.

The outer race 58 has the plural protruding portions 58a on the outer peripheral part thereof. The protruding portions 58a are engaged with the recesses 102i formed in the accommodation space 102g. The outer race 58 is thereby non-rotatably mounted to the accommodation space 102g. In the radial direction, a relatively large clearance exists between the tip end of each protruding portion 58a and each recess 102i of the accommodation space 102g. In the rotational direction, in contrast, a small clearance is exists therebetween. Thus, similarly to the aforementioned exemplary embodiment, the outer race 58 is configured to be automatically axis-aligned by the inner race 57 and the rolling elements 59. Further, the outer race 58 has the curved cam surface 58b on the inner peripheral surface thereof. The cam surface 58b is formed for exerting a wedge effect on the rolling elements 59. The width (axial length) of the outer race 58 is less than the axial length of the rolling elements 59.

The rolling elements 59 of the present exemplary embodiment are structured similarly to those of the aforementioned exemplary embodiment. The rolling elements 59 are formed in a cylindrical roller shape. The rolling elements 59 are held by the spring holding member 61.

The spring members 60 and the spring holding member 61 of the present exemplary embodiment are structured similarly to those of the aforementioned exemplary embodiment. The spring holding member 61 has the holding protrusions 61a and the holding holes 61b. The spring holding member 61 is rotatably attached to the accommodation space 102g. The spring members 60 are held by the spring holding member 61, while being aligned at an interval in the circumferential direction.

The third seal member 169 is disposed on the front surface of the outer race 58 in order to seal the accommodation space 102g. The third seal member 169 includes a seal body 177 and a backup ring 178. The seal body 177 is made of synthetic rubber such as NBR (Nitrile Butadiene Rubber) or silicone rubber. The backup ring 178 is made of metal and reinforces the seal body 177. The seal body 177 has a contact portion 177a and a lip portion 177b. The contact portion 177a is formed on the outer peripheral side of the seal body 177. The contact portion 177a makes contact with the inner peripheral surface of the accommodation space 102g and the front surface of the outer race 58. The lip portion 177b is formed on the inner peripheral side of the seal body 177. The lip portion 177b is a tapered portion slanted forwards. The lip portion 177b makes contact with the gap filling member 36 of the attachment portion 33a of the rotor 3. The third seal member 169 has a relatively large area. Therefore, the third seal member 169 is reinforced by the backup ring 178. In other words, the third seal member 169 also functions as a lid member for closing the opening of the accommodation space 102g.

The retainer member 174 is formed by bending a spring wire rod made of metal in a deformed quadrangular shape. As illustrated in FIG. 6, the retainer member 174 has a plurality of circular-arc portions 174a and a plurality of connecting portions 174b. The circular-arc portions 174a are convexly curved to the radially outward. The circular-arc portions 174a are attachable to the attachment groove 102h. The connecting portions 174b are convexly curved to the radially inward. The connecting portions 174b connect the circular-arc portions 174a. The retainer member 174 retains the third seal member 169 by causing the circular-arc portions 174a to be attached to the attachment groove 102h and causing the connecting portions 174b to make contact with the front surface of the third seal member 169. A clearance is between the rear surface of the third seal member 169 and the rolling elements 59. Therefore, a washer 180 made of synthetic resin is disposed for filling the clearance and thereby inhibiting wobbling of the rolling elements 59.

The switch mechanism 55 of the present exemplary embodiment is structured similarly to that of the aforementioned exemplary embodiment. The switch mechanism 55 is configured to switch the one-way clutch assembly 151 between the activated state and the deactivated state. The switch mechanism 55 includes the switch lever 66 and the switch plate 67.

In the spinning reel thus structured, the anti-reverse mechanism 150 can be simply structured.

(b) In the aforementioned exemplary embodiment, the present invention has been explained by exemplifying a spinning reel of a front drag type. However, the present invention is also applicable to a spinning reel of a rear drag type.

(c) In the aforementioned exemplary embodiment, an O-ring is used as the first seal member 53. However, except for the O-ring any suitable annular seal member such as a lipped seal member can be used as the first seal member 53. Further, as the second seal member 54, any suitable seal member of the other type such as an O-ring can be used.

(d) In the aforementioned exemplary embodiment, the cover member 52 is composed of the first cover part 64 and the second cover part 65. However, in the present invention, the structure of the cover member 52 is not limited to the above. The cover member 52 can be composed of a single closed-end tubular member.

(e) In the aforementioned exemplary embodiment, the attachment portion 33a of the rotor 3 is provided with the gap filling member 36, and the second seal member 54 is caused to make contact with the gap filling member 36. However, the present invention is not limited to the structure. For example, the attachment portion 33a is not required to be provided with the gap filling member 36. In this case, the second member 54 can he caused to directly make contact with the attachment portion 33a.

(f) In the aforementioned exemplary embodiment, the one-way clutch assembly 51 of a roller type with a free-wheeling inner race 57 is used. However, the present invention is not limited to the structure. For example, the one-way clutch assembly of a roller type with a free-wheeling outer race can be used.

Features

The aforementioned exemplary embodiments can be expressed as follows.

(A) The spinning reel 100 is a reel configured to forwardly reel out the fishing line. The spinning reel 100 includes the handle 1, the reel unit 2, the rotor 3, the spool 4, the rotor drive mechanism 5, and the anti-reverse mechanism 50 (or 150). The reel unit 2 supports the handle 1 in a rotatable state. The reel unit 2 has the fishing rod attachment portion 2b and the mount portion 2e (or 102e). The fishing rod attachment portion 2b allows the fishing rod to be attached thereto. The mount portion 2e (or 102e) is formed in a circular shape and is disposed in the front part of the reel unit 2. The mount portion 2e (or 102e) has the through hole 2f bored in the center thereof. The through hole 2f is disposed in the back-and-forth direction. The rotor 3 has the attachment portion 33a formed in a tubular shape. The rotor 3 is rotatably mounted to the reel unit 2. The spool 4 is a member that the fishing line is wound thereabout by the rotor 3. The spool 4 is mounted to the reel unit 2 so as to reciprocate back and forth. The rotor drive mechanism 5 includes the drive gear 11 and the pinion gear 12 formed in a tubular shape. The drive gear 11 has the face gear teeth. The drive gear 11 is configured to be rotated in conjunction with the rotation of the handle 1. The pinion gear 12 is coupled at the front portion thereof to the attachment portion 33a of the tutor 3 so as to be unitarily rotatable therewith. The pinion gear 12 is disposed in the back-and-forth direction while penetrating through the through hole 2f The pinion gear 12 is meshed with the drive gear 11. The anti-reverse mechanism 50 (or 150) is configured to prevent the rotor 3 from rotating in the fishing-line releasing direction. The anti-reverse mechanism 50 (or 150) includes the one-way clutch assembly 51 (or 151). The one-way clutch assembly 51 (or 151) is detachably attached to the mount portion 2e (or 102e) of the reel body 2a (or 102a). The rotor drive mechanism 5 includes the seal member 16. The seal member 16 seals the clearance between the pinion gear 12 and the through hole 2f while being disposed rearwards of the one-way clutch assembly 51 (or 151). That means that the seal member 16 is at the rear end of the one-way clutch assembly 51 (or 151).

According to the spinning reel 100, in the rotor drive mechanism 5, the seal member 16 seals the clearance between the pinion gear 12 and the through hole 2f in which the pinion gear 12 is disposed, while being disposed rearwards of the one-way clutch assembly 51 (or 151). Therefore, it is possible to inhibit intrusion of a foreign object into the anti-reverse mechanism 50 (or 150) from the interior of the reel body 2a (or 102a). Further, it is also possible to inhibit intrusion of a foreign object into the interior of the reel body 2a (or 102a) from the anti-reverse mechanism 50 (or 150).

(B) The pinion gear 12 can include the attachment groove 12e annularly formed on an outer peripheral portion thereof. The seal member 16 can attached to the annular attachment groove 12e. Further, the seal member 16 can be in contact with the inner peripheral surface of the through hole 2f. In this case, the seal member 16 is configured to be rotated together with the pinion gear 12. Therefore, a foreign object is scattered by centrifugal force. Accordingly, it is possible to further inhibit intrusion of a foreign object into the anti-reverse mechanism 50 (150).

(C) The seal member 16 can have the ring portion 16a and the tip portion 16b. The ring portion 16a is attached to the attachment groove 12e. The lip portion 16b is tapered and integrally formed with the ring portion 16a. The lip portion 16b makes contact with the inner peripheral surface of the through hole 2f. In this case, the portion of the seal member 16, which makes contact with the inner peripheral surface of the through hole 2f, is the tapered lip portion 16b, Therefore, even when the seal member 16 is rotated, slide resistance is suppressed low. Accordingly, it is possible to suppress degradation in rotational performance of the pinion gear 12.

(D) The pinion gear 12 can be disposed rearwards of the one-way clutch assembly 51 (or 151). The pinion gear 12 can include the gear teeth 12d to be meshed with the face gear teeth. The reel unit can include the front bearing 14a and the rear bearing 14b. The pinion gear 12, can be rotatably supported by the reel body 2a (102a) through the front bearing 14a and the rear bearing 14b. The front and rear bearings 14a and 14b are disposed on the both sides of the gear teeth 12d at an interval in the back-and-forth direction. Further, the seal member 16 can be disposed further away from the one-way clutch assembly 51 than the front bearing 14a from the one-way clutch assembly 51. In this case, it is possible to inhibit intrusion of a foreign object into the front bearing 14a.

(E) The lip portion 16b can be slanted towards the front bearing 14a. In this case, the lip portion 16b becomes unlikely to be inclined even when the pinion gear 12 is attached to the reel body 2a (or 102a) from the front side while the seal member 16 is attached to the pinion gear 12. Therefore, the pinion gear 12 can be attached to the reel body 2a (or 102a) without deforming the lip portion 16b.

(F) The anti-reverse mechanism 50 can further include the cover member 52 for waterproof The cover member 52 includes the bottom portion 64a and the tubular portion 64b. The bottom portion 64a has a ring shape and covers the front surface of the one-way clutch assembly 51. The pinion gear 12 penetrates through the bottom portion 64a. The tubular portion 64b covers the outer peripheral portion 51a of the one-way clutch assembly 51 and the outer peripheral portion of the mount portion 2e. In this case, even when the one-way clutch assembly 51 is attached to the front surface of the mount portion 2e, it is possible to inhibit intrusion of a foreign object into the interior of the one-way clutch assembly 51 through the boundary portion between the mount portion 2e and the one-way clutch assembly 51.

(G) The one-way clutch assembly 51 can include the case member 56, the inner race 57, the outer race 58 and the plural rolling elements 59. The case member 56 has a circular shape. The case member 56 is attached to the mount portion 2e. The outer peripheral portion 51a of the one-way clutch assembly 51 is configured at the case member 56. The inner race 57 is coupled to the pinion gear 12 so as to be unitarily rotatable therewith. The outer race 58 is non-rotatably mounted to the case member 56. The rolling elements 59 are disposed between the inner race 57 and the outer race 58. In this case, the inner race 57, the outer race 58 and the rolling elements 59 can be disposed hi the interior of the case member 56. Therefore, the one-way clutch assembly 51 can be integrated as a unit. Accordingly, the one-way clutch assembly 51 can be preliminarily assembled, and can be easily embedded into the reel body 2a.

(H) The anti-reverse mechanism 50 can further include the first seal member 53 and the second seal member 54. The first seal member 53 seals the clearance between the mount portion 2e and the tubular portion 64b. The second seal member 54 seals the clearance between the attachment portion 33a of the rotor 3 and the bottom portion 64a of the cover member 52. In this case, it is possible to seal the clearance between the tubular portion 64b of the cover member 52 and the mount portion 2e and seal the clearance between the cover member 52 and the attachment portion 33a of the rotor 3. Therefore, it is possible to thither inhibit intrusion of a foreign object into the interior of the one-way clutch assembly 51.

(I) The mount portion 2e can include the annular groove 2g on the outer peripheral portion thereof. The first seal member 53 can be attached to the annular groove 2g. Further, the first seal member 53 can be in contact with the inner peripheral surface of the tubular portion 64b. In this case, the first seal member 53 is attached to the annular groove 2g. Thus, the cover member 52 can be easily attached to the mount portion 2e.

(J) The anti-reverse mechanism 50 can further include the plural first screw members 70. The first screw members 70 are screwed into the mount portion 2e while penetrating through the cover member 52 and the case member 56. The first screw members 70 are disposed at intervals in the circumferential direction. In this case, the one-way clutch assembly 51 and the cover member 52 can be collectively fixed to the mount portion 2e by screwing the first screw members 70 into the mount portion 2e.

(K) The anti-reverse mechanism 50 can further include the second screw members 72. The second screw members 72 are screwed into the case member 56 while penetrating through the cover member 52. In this case, the one-way clutch assembly 51 including the cover member 52 can be integrated as a unit by screwing the second screw members 72 into the case member 56.

(L) The mount portion 102e can have the accommodation space 102g formed in a circular shape. The accommodation space 102g is opened to the lip end thereof. The accommodation space 102g is capable of accommodating the one-way clutch assembly 151. Further, the one-way clutch assembly 151 can include the inner race 57, the outer race 58 and the plural rolling elements 59. The inner race 57 is coupled to the pinion gear 12 so as to be unitarily rotatable therewith. The outer race 58 is non-rotatably mounted to the accommodation space 102g. The rolling elements 59 are disposed between the inner race 57 and the outer race 58. In this case, the one-way clutch assembly 151 is accommodated in the accommodation space 102g in the reel body 102a. Therefore, the anti-reverse mechanism 150 can be formed with a simple structure.

(M) The anti-reverse mechanism 150 can further include the third seal member 169 and the retainer member 174. The third seal member 169 seals the accommodation space 102g while being mounted to the front surface of the outer race 58. The retainer member 174 retains the third seal member 169 with respect to the accommodation space 102g. In this case, the third seal member 169 can inhibit intrusion of a foreign object into the accommodation space 102g. Further, the retainer member 174 can prevent detachment of the third seal member 169 from the accommodation space 102g.

Advantageous Effects of Invention

According to the present invention, the seal member seals the clearance between the pinion gear and the through hole in which the pinion gear is disposed, while being disposed rearwards of the one-way clutch assembly. Therefore, it is possible to inhibit intrusion of a foreign object into the anti-reverse mechanism from the interior of the reel unit.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean an amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can he made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel being configured to reel out a fishing line in a forward direction, comprising:
   a handle;
   a reel unit supporting the handle in a rotatable state, the reel unit having a fishing rod attachment portion and a mount portion, the fishing rod attachment portion allowing a fishing rod to be attached thereto, the mount portion having a circular shape, the mount portion being disposed in a front part of the reel unit, the mount portion having a through hole in a center thereof, the through hole extending in the forward direction;
   a rotor having an attachment portion having a tubular shape, the rotor being rotatably mounted to the reel unit;
   a spool on which the fishing line is wound by the rotor, the spool being mounted to the reel unit to be reciprocated in a back and forth direction being parallel to the forward direction;
   a rotor drive mechanism including a drive gear and a pinion gear, the drive gear having face gear teeth, the drive gear being configured to be rotated in conjunction with rotation of the handle, the pinion gear having a tubular shape, the pinion gear being coupled at a front portion thereof to the attachment portion of the rotor to be unitarily rotatable with the attachment portion, the pinion gear being disposed in the through hole, the pinion gear being meshed with the drive gear; and
   an anti-reverse mechanism being configured to prevent the rotor from rotating in a fishing-line releasing direction, the anti-reverse mechanism including a one-way clutch assembly, being detachably attached to the mount portion of the reel unit,
   the rotor drive mechanism including a seal member,
   the seal member is configured to seal a clearance between the pinion gear and the through hole while being disposed at a rear end of the one-way clutch assembly in the back-and forward direction, so as to prevent intrusion of a foreign object into the one-way clutch assembly.

2. The spinning reel according to claim 1, wherein the pinion gear includes an attachment groove annularly formed on an outer peripheral portion thereof, the seal member is attached to the attachment groove, and the seal member is in contact with an inner peripheral surface of the through hole.

3. The spinning reel according to claim 1, wherein the mount portion has an accommodation space having a circular shape, the accommodation space is open at a tip end thereof, the accommodation space accommodates the one-way clutch assembly, the one-way clutch assembly includes an inner race, an outer race and a plurality of rolling elements, the inner race is coupled to the pinion gear to be unitarily rotatable therewith, the outer race is non-rotatably mounted to the accommodation space, and the rolling elements are disposed between the inner race and the outer race.

4. The spinning reel according to claim 3, wherein the anti-reverse mechanism further includes a third seal member and a retainer member, the third seal member is configured to seal the accommodation space while being mounted to a front surface of the outer race, and the retainer member is configured to prevent the third seal member from coming out from the accommodation space.

5. The spinning reel according to claim 1, wherein the seal member is rubber.

6. A spinning reel configured to reel out a fishing line in a forward direction comprising:
a handle;
a reel unit supporting the handle in a rotatable state, the reel unit having a fishing rod attachment portion and a mount portion, the fishing rod attachment portion allowing a fishing rod to be attached thereto, the mount portion having a circular shape, the mount portion being disposed in a front part of the reel unit, the mount portion having a through hole in a center thereof, the through hole extending in the forward direction;
a rotor having an attachment portion having a tubular shape, the rotor being rotatably mounted to the reel unit;
a spool on which the fishing line is wound by the rotor, the spool being mounted to the reel unit to be reciprocated in a back and forth direction being parallel to the forward direction;
a rotor drive mechanism including a drive gear and a pinion gear, the drive gear having face gear teeth, the drive gear being configured to be rotated in conjunction with rotation of the handle, the pinion gear having a tubular shape and including an attachment groove annularly formed on an outer peripheral portion thereof, the pinion gear being coupled at a front portion thereof to the attachment portion of the rotor to be unitarily rotatable with the attachment portion, the pinion gear being disposed in the through hole, the pinion gear being meshed with the drive gear, the seal member is attached to the attachment groove, and the seal member being in contact with an inner peripheral surface of the through hole; and an anti-reverse mechanism being configured to prevent the rotor from rotating in a fishing-line releasing direction, the anti-reverse mechanism including a one-way clutch assembly, being detachably attached to the mount portion of the reel unit,
the rotor drive mechanism including a seal member,
the seal member having a ring portion and a lip portion, and configured to seal a clearance between the pinion gear and the through hole while being disposed at a rear end of the one-way clutch assembly in the back-and forward direction,
the pinion gear including an attachment groove annularly formed on an outer peripheral portion thereof,
the seal member being attached to the attachment groove, and
the seal member being in contact with an inner peripheral surface of the through hole,
the ring portion being attached to the attachment groove,
the lip portion being tapered and integrally formed with the ring portion, and
the lip portion making contact with the inner peripheral surface of the through hole.

7. The spinning reel according to claim 6, wherein the pinion gear is disposed at the rear end of the one-way clutch assembly,
the pinion gear includes gear teeth to be meshed with the face gear teeth,
the reel unit includes a front bearing and a rear bearing,
the pinion gear is rotatably supported by the reel unit through the front bearing and the rear bearing,
the front and rear bearings are disposed on the both sides of the gear teeth at an interval in the back-and-forth direction, and
the seal member is disposed further away from the one-way clutch assembly than the front bearing from the one-way clutch assembly.

8. The spinning reel according to claim 7, wherein the lip portion is slanted towards the front bearing.

9. A spinning reel according being configured to reel out a fishing line in a forward direction, comprising:
a handle;
a reel unit supporting the handle in a rotatable state, the reel unit having a fishing rod attachment portion and a mount portion, the fishing rod attachment portion allowing a fishing rod to be attached thereto, the mount portion having a circular shape, the mount portion being disposed in a front part of the reel unit, the mount portion having a through hole in a center thereof, the through hole extending in the forward direction;
a rotor having an attachment portion having a tubular shape, the rotor being rotatably mounted to the reel unit:
a spool on which the fishing line is wound by the rotor, the spool being mounted to the reel unit to be reciprocated in a back and forth direction being parallel to the forward direction;
a rotor drive mechanism including a drive gear and a pinion gear, the drive gear having face gear teeth, the drive gear being configured to be rotated in conjunction with rotation of the handle, the pinion gear having a tubular shape, the pinion gear being coupled at a front portion thereof to the attachment portion of the rotor to be unitarily rotatable with the attachment portion, the pinion gear being disposed in the through hole, the pinion gear being meshed with the drive gear; and
an anti-reverse mechanism being configured to prevent the rotor from rotating in a fishing-line releasing direction, the anti-reverse mechanism including a one-way clutch assembly, being detachably attached to the mount portion of the reel unit, the rotor drive mechanism including a seal member, the seal member is configured to seal a clearance between the pinion gear and the through hole while being disposed at a rear end of the one-way clutch assembly in the back-and forward direction, the anti-reverse mechanism further including a cover member for waterproofing, the cover member including a bottom portion and a tubular portion, the bottom portion having a ring shape and covering a front surface of the one-way clutch assembly, the pinion gear penetrating through the bottom portion, and the tubular portion covering an outer peripheral portion of the one-way clutch assembly and an outer peripheral portion of the mount portion.

10. The spinning reel according to claim 9, wherein the one-way clutch assembly includes a case member, an inner race, an outer race and a plurality of rolling elements, the case member has a circular shape, the case member is attached to the mount portion, the outer peripheral portion of the one-way clutch assembly is configured at the case member, the inner race is coupled to the pinion gear to be unitarily rotatable therewith, the outer race is non-rotatably mounted to the case member, and the rolling elements are disposed between the inner race and the outer race.

11. The spinning reel according to claim 10, wherein the anti-reverse mechanism further includes a first seal member and a second seal member, the first seal member is configured to seal a clearance between the mount portion and the tubular portion, the second seal member is configured to seal a clearance between the attachment portion of the rotor and the bottom portion of the cover member.

12. The spinning reel according to claim 11, wherein the mount portion includes an annular groove on an outer peripheral portion thereof, the first seal member is attached to the annular groove, and the first seal member is in contact with an inner peripheral surface of the tubular portion.

13. The spinning reel according to claim 9, wherein the anti-reverse mechanism further includes a plurality of first screw members, the first screw members are screwed into the mount portion while penetrating through the cover member and the case member, and the first screw members are disposed at an interval in a circumferential direction.

14. The spinning reel according to claim 9, wherein the anti-reverse mechanism further includes a second screw member, the second screw member is screwed into the case member while penetrating through the cover member.

* * * * *